United States Patent [19]

Lamarche

[11] 4,427,400
[45] Jan. 24, 1984

[54] SERIES DAMPER DYNAMIC LAG SYSTEM

[75] Inventor: Paul E. Lamarche, Utica, Mich.

[73] Assignee: Borg-Warner Corporation, Chicago, Ill.

[21] Appl. No.: 332,031

[22] Filed: Dec. 18, 1981

[51] Int. Cl.³ .............................................. F16D 3/14
[52] U.S. Cl. .................................. 464/64; 192/106.2; 464/68
[58] Field of Search .................. 464/68, 67, 66, 64, 464/62; 192/106.2, 106.1, 70.17, 70.18, 105 BA, 103 B

[56] References Cited

U.S. PATENT DOCUMENTS

| 2,053,180 | 9/1936 | Carter | 64/30 |
| 2,214,602 | 9/1940 | Arnold | 192/106 |
| 2,826,902 | 3/1958 | DeCoursey | 192/106.2 |
| 2,909,911 | 10/1959 | Spaetgens | 464/66 |
| 4,232,534 | 11/1980 | Lamarche | 64/27 C |
| 4,279,132 | 7/1981 | Lamarche | 64/27 C |
| 4,304,107 | 12/1981 | Fall et al. | 64/27 C |

FOREIGN PATENT DOCUMENTS 508262 12/1954 Canada .............................. 464/66

Primary Examiner—John M. Jillions
Attorney, Agent, or Firm—James A. Geppert

[57] ABSTRACT

A vibration damper with a built-in self-energizing lag system adapted to reduce the tip-in and tip-out effects of automotive lock-up torque converters for an automatic transmission. The lag system comprises a friction lag plate having a generally wedge shape that is received in a complementary notch formed in the outer surface of each hub arm of the vibration damper and will be urged outwardly by centrifugal force to slide in a channel formed in the housing for the damper to offer a resistance to movement of the hub that is proportional to the centrifugal force resulting from engine rpm.

10 Claims, 5 Drawing Figures

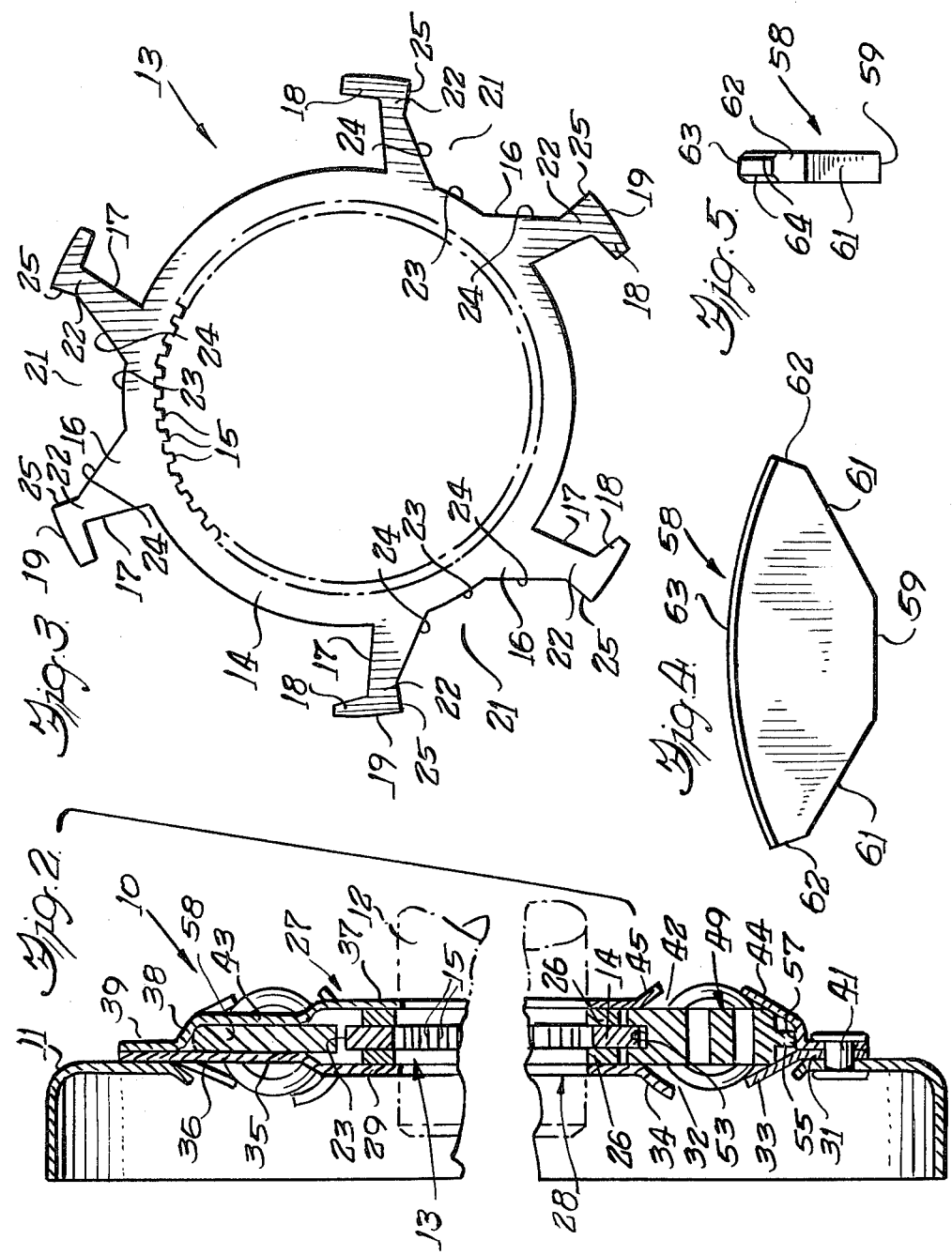

SERIES DAMPER DYNAMIC LAG SYSTEM

BACKGROUND OF THE INVENTION

The present invention relates to a vibration damper for a clutch in an automotive vehicle, such as a clutch for a manual transmission or a lock-up clutch in a torque converter for an automatic transmission. A vibration damper providing an extended travel in the damper operation for a clutch assembly in the torque converter of an automatic transmission drive line is desirable to neutralize any torsional vibrations emanating from the vehicle engine, and one version is shown in my U.S. Pat. No. 4,279,132. However, in these rotary applications, there exists a need to reduce the effects of rapid positive and negative torques occurring in the clutch system, otherwise referred to as tip-in and tip-out effects. The rapid positive and negative torques occur when the operator suddenly lifts his foot from the accelerator pedal to cause a rapid deceleration or suddenly presses down on the pedal for rapid acceleration. These sudden changes cause an undesirable jerking sensation. The self-energizing lag system of the present invention acts to smooth out the effects of rapid positive and negative torques.

SUMMARY OF THE INVENTION

The present invention comprehends the provision of a built-in self-energizing lag system for an extended travel vibration damper assembly adapted for use in a lock-up clutch in an automotive torque converter or similar rotary applications. The damper assembly includes a hub member having radial arms, a damper housing formed of front and rear retainer plates having inwardly offset input or drive straps axially aligned with the hub arms, and sliding spring separators in the housing; each separator positioned between a pair of damper spring sets located between adjacent hub arms. Each hub arm includes a relatively wide peripheral notch receiving a friction lag plate that frictionally engages a channel formed in the housing with a force proportional to the centrifugal force caused by rotation of the clutch and damper due to the engine rpm.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the damper assembly taken on the irregular line 2—2 of FIG. 1.

FIG. 3 is a rear elevational view of the hub member for the damper assembly.

FIG. 4 is an elevational view of the friction lag plate for the lag system.

FIG. 5 is an edge view of the friction lag plate taken from the right-hand side of FIG. 4.

DESCRIPTION OF THE PREFERRED EMBODIMENT

Figure 1:
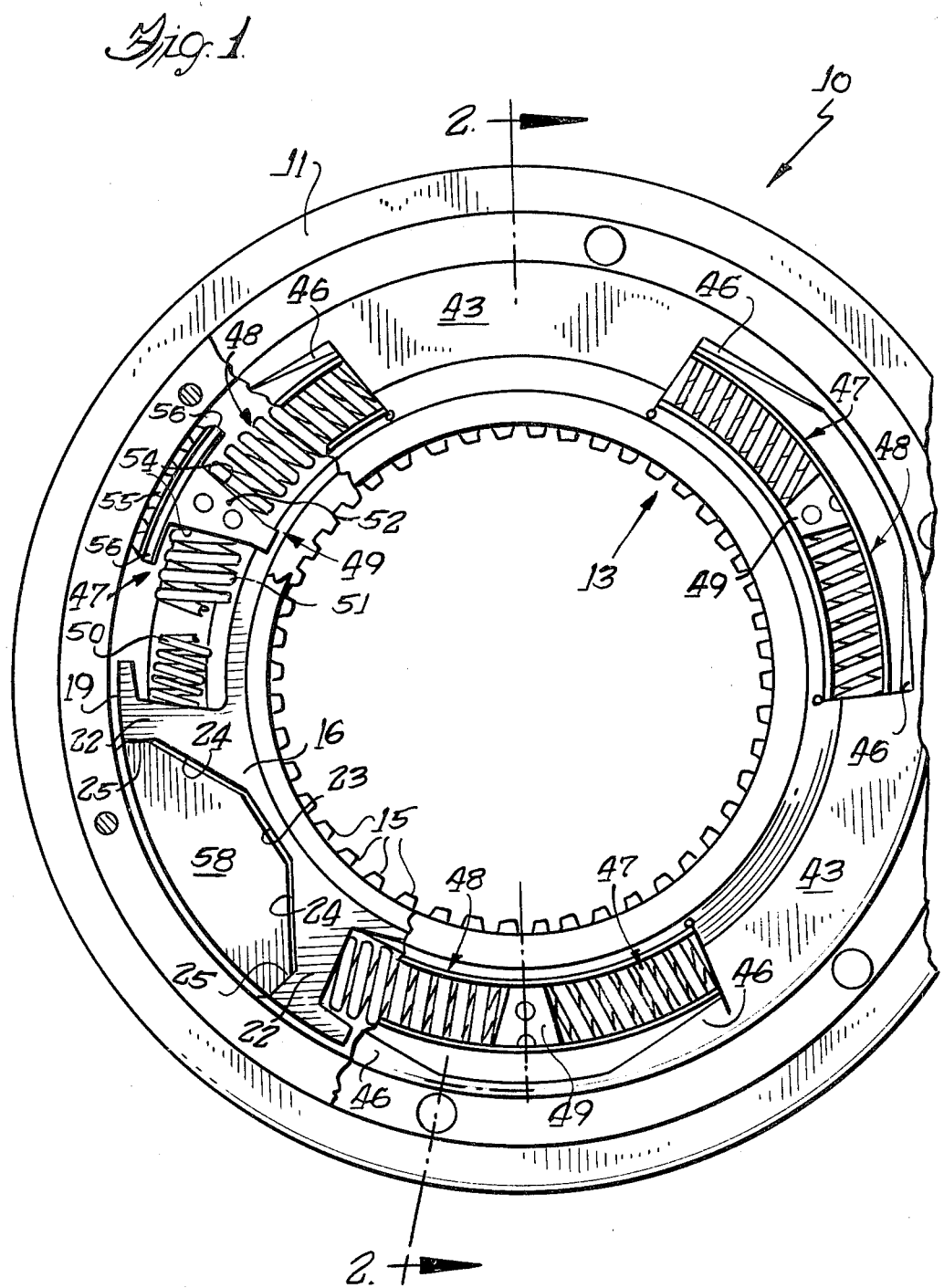
FIG. 1 is a rear elevational view with portions broken away of a clutch vibration damper incorporating the built-in self-energizing lag system of the present invention.

Referring more particularly to the disclosure in the drawings wherein is shown an illustrative embodiment of the present invention, FIGS. 1 and 2 disclose an extended travel vibration damper assembly 10 for connection to a torque input means or attaching ring 11, which may be connected to a friction plate for a clutch in a standard manual transmission or to a piston plate located within the housing of a torque converter for an automatic transmission, (not shown), and acting to drive a torque output means 12, such as a transmission input shaft or the turbine hub of the turbine for a torque converter. The damper assembly includes a hub 13 (FIG. 3) in the form of an annular ring 14 having internal splines or teeth 15 for a driving connection with a shaft or turbine hub.

The hub has three circumferentially equally spaced radially extending arms 16, each arm having outwardly diverging sides 17 terminating in circumferentially oppositely extending ears 18 joined by an arcuate outer edge 19. Formed in the edge 19 is a generally V-shaped notch 21 dividing the arm into a pair of fingers 22, each notch having a flat central base 23, outwardly diverging camming surfaces 24,24 and then slightly diverging end walls 25,25. On each side of the hub ring 14 are spacer rings 26,26 to locate the hub in a vibration damper housing 27.

The housing includes a front retainer plate 28 and a rear retainer plate 37. The front retainer plate 28 is formed as an annular plate or ring 29 having a slightly rearwardly offset peripheral flange 31 and three elongated arcuate slots or openings 32 defined by outer inclined lips 33 and inner curved lips 34 with slightly rearwardly offset drive straps 35 separating the slots 32, each strap being in the same plane with the flange 31 and axially aligned with a hub arm 16. Each outer lip 33 adjacent the strap 35 is formed with a reentry ramp (not shown).

The rear retainer plate 37 is in the form of an annular ring terminating at its outer edge in a generally axially extending wall 38 which in turn terminates in a peripheral flange 39 abutting the flange 31; the flanges being suitably secured to the attaching ring 11, such as by rivets 41. The plate 37 has three elongated arcuate slots or openings 42 axially aligned with slots 32 and separated by inwardly offset drive straps 43, each slot being defined by an outer inclined lip 44 and an inner curved lip 45; the outer lips having reentry ramps 46 leading into the drive straps 43.

Located within each pair of axially aligned arcuate slots 32,42 are two spring sets 47,48 with a sliding spring separator 49 between the two sets. Each spring set consists of one or more concentric compression springs, such as inner spring 50 and outer spring 51, and abuts an edge or side 17 of a hub arm 16. The sliding spring separator 49 includes a wedge-shaped body 52 with inwardly converging edges 54,54 terminating in an inner end having a notch 53 (FIG. 2) and in a narrow arcuate outer edge 55 extending beyond the edges 54 as ears 56,56. The retainer plates 28,37 form a circumferential channel 57 in which ride the arcuate edge 55 of each divider, the arcuate edge 19 of each hub arm 16 and the arcuate edges 63 of friction lag plates 58.

Each friction lag plate 58 is a flat plate of a shape complementary to a hub arm notch 21 into which the lag plate is received; the plate having a flat base 59, outwardly diverging camming surfaces 61, slightly outwardly diverging sides 62 (see FIG. 4), and an arcuate outer edge 63 which is chamfered along the sides as at 64 (FIG. 5).

In operation, the three pairs or groups of spring sets 47,48 act in parallel with the spring sets in each group acting in series when torque is applied to the clutch and to the vibration damper 10 through the attaching ring 11. Upon application of torque, the housing 27 is rotated and the aligned pairs of drive straps 35,43 act on the spring sets 47 to compress the springs in each set against the sliding spring separators 49. Movement of the separators results in compression of spring sets 48 which act on the hub arms 16 to rotate the hub 13 and the torque output means 12. Upon rotation of the hub, the friction lag plates 58 slide in the channel 57 while being pulled or pushed by the fingers 22 of the hub arms 16. The camming surfaces 24 in each notch cooperate with the camming surfaces 61 on each lag plate to urge the plates outwardly to increase frictional contact with the housing 27, and the mass of the lag plates is acted upon by centrifugal force of the rotating hub to enhance the outward force on the lag plates. Thus, the frictional contact of the lag plates against the housing 27 offers a resistance to movement of the lag plates, and thus the hub, that is proportional to the centrifugal force resulting from vehicle engine rpm. This resistance to movement acts to smooth out any rapid changes in positive and/or negative torques.

I claim:

1. A torsional vibration damper assembly for use in a vehicle clutch to transmit torque between driving and driven members including an input member operatively connected to torque input means, a hub member operatively connected to torque output means and having at least two circumferentially equally spaced radial arms, at least one spring separator positioned between adjacent hub arms and floating independently of the hub member, compression spring sets interposed between said hub arms and spring separators, and a pair of retainer plates operatively connected to said input member and substantially enclosing the hub member, spring separators and spring sets, said retainer plates having axially aligned elongated arcuate slots separated by inwardly offset drive straps and accommodating said spring sets, the improvement comprising a notch formed in the outer edge of each hub arm, and a friction lag plate received in each notch, said notches in the hub arms and the friction lag plates having complementary camming surfaces acting to urge the lag plates outwardly into sliding engagement with said retainer plates upon rotation of said hub member.

2. A vibration damper assembly as set forth in claim 1, wherein said retainer plates form a peripheral channel in which the outer edges of the hub arms, friction lag plates and spring separators travel.

3. A vibration damper assembly as set forth in claim 1, in which each said friction lag plate has an arcuate outer edge which is chamfered on the opposite surfaces thereof.

4. A vibration damper assembly as set forth in claim 2, wherein said spring separators are wedge-shaped with an outer narrow arcuate edge received in said peripheral channel to slide therein.

5. A vibration damper assembly as set forth in claim 4, wherein said hub member comprises an annular ring, and each spring separator has a notch in its inner end receiving the outer edge of the annular hub ring therein.

6. A vibration damper assembly as set forth in claim 1, wherein said hub arms and notches are relatively wide with each notch including a flat base portion, a pair of outwardly diverging camming surfaces, and a pair of slightly outwardly diverging side edges.

7. A vibration damper assembly as set forth in claim 6, in which each notch divides said hub arm into a pair of hub fingers acting on said friction lag plate.

8. A vibration damper assembly as set forth in claim 7, in which the camming surfaces on each lag plate and in each notch and the centrifugal force of rotation of said hub member act to urge each lag plate radially outwardly into frictional engagement in said channel of the retainer plates to offer resistance to rotation of said hub member relative to said retainer plates.

9. A vibration damper assembly as set forth in claim 5, in which said hub member has three equally spaced radial arms, a spring separator positioned between each adjacent pair of hub arms, and three pair of spring sets received between adjacent hub arms with a spring separator between the spring sets of each pair.

10. A vibration damper assembly as set forth in claim 9, wherein each pair of spring sets forms a group with the groups acting in parallel, and the spring sets in each group acting in series.

* * * * *